United States Patent [19]
Pier

[11] 3,716,274
[45] Feb. 13, 1973

[54] COMBINED ELECTRONIC AND FLUID PRESSURE BRAKE CONTROL APPARATUS

[75] Inventor: Jerome R. Pier, Export, Pa.

[73] Assignee: Westinghouse Air Brake Company, Wilmerding, Pa.

[22] Filed: Sept. 28, 1971

[21] Appl. No.: 184,346

[52] U.S. Cl. .................... 303/20, 303/16, 303/18, 303/22 R
[51] Int. Cl. ............................................. B60t 15/18
[58] Field of Search ......... 303/3, 15, 16, 18, 20, 22 R

[56] References Cited

UNITED STATES PATENTS 3,560,057  2/1971  Worbois ........................... 303/20 X Primary Examiner—Duane A. Reger
Attorney—Ralph W. McIntire, Jr. et al.

[57] ABSTRACT

A rapid transit type railway brake control system in which an electronic control unit is employed to normally regulate electro-pneumatic control of the friction brakes in a manner to continuously supplement the effective dynamic brake sufficient to satisfy the brake demand input. Flow of electric current in a control wire (P-wire) to the electronic control unit is selectively varied to provide the desired braking in accordance with operation of a controller device which is adapted to concurrently vary brake pipe pressure proportional to the generated control wire current. A transfer valve under control of a fault sensing device which monitors the electronic control unit normally maintains a proportional brake control valve device operative under electro-pneumatic mode of control. In the event a failure or malfunction of the electronic control unit is detected by the fault sensing device, the transfer valve will operate to automatically switch the brake control valve to automatic-pneumatic mode of control under the influence of brake pipe fluid pressure.

7 Claims, 1 Drawing Figure

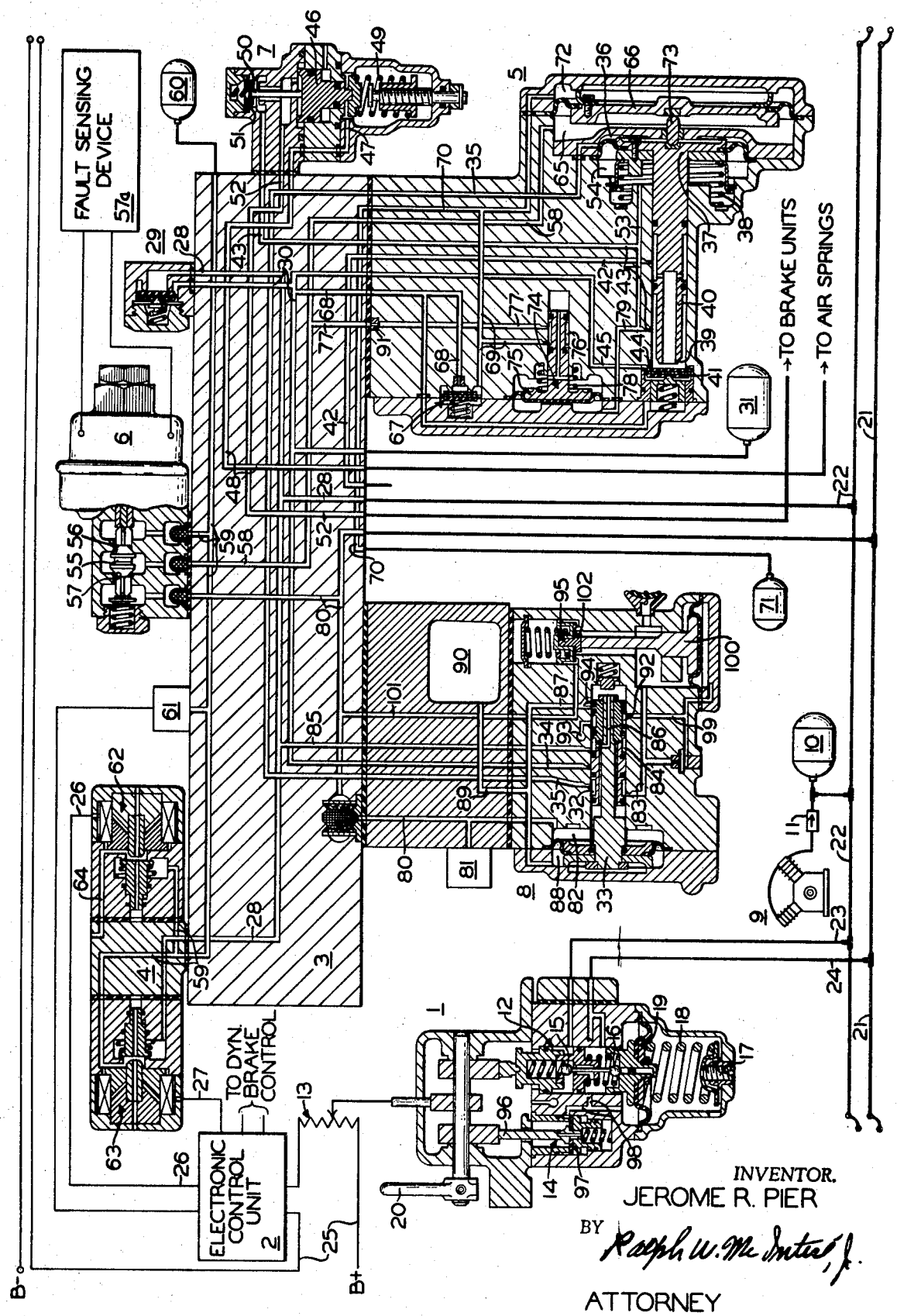

COMBINED ELECTRONIC AND FLUID PRESSURE BRAKE CONTROL APPARATUS

BACKGROUND OF THE INVENTION

Rapid Transit railroad properties have historically employed the electro-pneumatic concept of brake control to gain near instantaneous brake response on each car, consequently resulting in less interaction between cars. Electro-pneumatic brake control systems have more recently been updated to utilize the solid state electronic technology in order to achieve reliable operation under the extreme conditions existing in railroad operations.

One exemplary system employs an electronic control unit having circuitry for modifying the brake demand signal in accordance with the vehicle load condition and dynamic brake effectiveness for providing a friction brake control signal in response to which pneumatic brake control pressure is developed. A pneumatic to electric transducer senses the effective brake control pressure to provide feedback information to the electronic unit to further modify the load weighed and dynamic brake modified friction brake control signal to provide continuous blending of the combined dynamic and friction braking necessary to satisfy the effective brake demand signal. In the event of a failure in the electronic control unit or the electro-magnetic transducer valve which controls development of pneumatic pressure in accordance with the output from the electronic control unit, an automatic full service brake application is automatically established on each car to bring the train to a halt. A manual changeover valve is provided for converting the brake control system from electro-pneumatic to automatic-pneumatic mode of brake control, in which variation of brake pipe pressure is effective to render the train operative on a "limp-in" basis to return to the station under control of the friction brake.

Since the above-mentioned changeover valve must be repositioned on each car in order to condition the train to proceed in automatic-pneumatic mode of control, a delay is imposed during which time the train is inoperative and consequently in danger of being struck by an approaching train from the rear, especially where tight operating schedules are employed.

SUMMARY OF THE INVENTION

It is therefore the object of this invention to provide an electronic type rapid transit brake control system in which a proportional pneumatic control valve device is automatically switched from electro-pneumatic mode of control to automatic-pneumatic mode of control responsive to a malfunction being detected in the electronic unit providing the electro-pneumatic mode of brake control.

In general, a brake control system is provided in which a controller device is arranged to vary the electrical signal of a P-wire in parallel with variation of brake pipe pressure which is normally cut-off from a pneumatic service control valve arranged to provide proportional application and release control of the vehicle brake pressure in a self-lapping manner of operation. In normal electro-pneumatic mode of control, the P-wire signal acting through an electronic control unit operates an electric-pneumatic transducer which produces variation of a fluid pressure friction brake control signal at the service control valve to control brake pressure accordingly. A transfer valve subject to a fault sensing circuit which monitors the electronic control unit is effective to provide an automatic transition of the service valve to automatic-pneumatic mode of control by communicating brake pipe pressure thereto when a malfunction of the electronic control unit is detected.

Other features and advantages of the invention such as a "holding" brake during initial charging and "quick action" propagation of an emergency brake application will be understood from the following more detailed description when considered with the single figure drawing illustrating a preferred embodiment of the invention in diagrammatic form.

Comprising in general the brake control system of the invention as proposed for each car of a rapid transit type railway train is a controller device 1, an electronic brake control unit 2, and a pneumatic brake control unit 3 including an electric/pneumatic transducer valve 4, a service brake control valve device 5, a transfer valve 6, a variable load control valve 7 and an emergency valve 8.

An air compressor 9 suitable for operation under transit type service conditions is provided to maintain a main reservoir 10 charged with fluid pressure via a one-way check valve 11 to a desired pressure range as determined by the setting of a compressor governor control device (not shown).

Controller device 1 is comprised of a pneumatic pressure regulator portion 12, an analog current generator portion 13 and an emergency vent valve device 14. Regulator portion 12 comprises a conventional self-lapping type valve assembly including an integral supply valve 15 and exhaust valve 16. A screw 17 is provided to adjust the force exerted by a control spring 18 on a control piston 19 in accordance with the position of a handle 20, which acts through a camshaft to actuate the supply and exhaust valves. The valve assembly operates in a conventional manner to assume a lap condition when the force exerted by spring 18 on piston 19 is balanced by the delivery pressure supplied to a brake pipe 21 via main reservoir 10, a pipe 22, branch pipe 23, controller 1 and a branch pipe 24, thereby regulating brake pipe fluid pressure in accordance with the selected position of controller handle 20. Brake pipe 21 and pipe 22 extend through each car, being coupled therebetween in a conventional manner to trainline the said pipes.

Generator portion 13 includes a suitable rheostat or other means adapted to vary a voltage potential for controlling flow of current in a P-wire 25 in accordance with the selected position of controller handle 20, the camshaft of which is effective to operate the rheostat to adjust its electrical resistance in parallel with variation of brake pipe pressure by pressure regulator portion 12. P-wire 25 is a continuous train line loop connected in a conventional manner between adjacent cars in the train by way of the electronic control unit 2 thereon.

Vent valve 14 normally interrupts communication between branch pipe 24 and atmosphere and is adapted to be operated to effect rapid venting of brake pipe fluid pressure from branch pipe 24 to atmosphere in accordance with movement of controller handle 20 beyond full application position to emergency position in which a cam associated with handle 20 actuates the vent valve 14, as hereinafter explained.

The electronic control unit 2 may be similar to the type described in U.S. Pat. No. 3,490,814, issued Jan. 20, 1970, and commonly assigned herewith to Westinghouse Air Brake Company, entitled "Electrically Controlled Fluid Braking System for Rapid Transit Cars." Since a detailed explanation of the electronic control unit 2 is covered in the above-mentioned patent, only the following brief description is deemed necessary for a full understanding of the present invention.

P-wire 25 is connected in series to the control winding of a magnetic amplifier of electronic control unit 2 which monitors P-wire current. The output of the magnetic amplifier is conditioned by a chopper driver and power amplifier to produce a uniform square wave signal having an amplitude proportional to current in P-wire 25, being connected to a brake transfer relay and via a contact thereof to a control capacitor via a rate charging resistor. As long as "P-wire" current varies within a preselected range of approximately 0-0.5 amps, the control capacitor remains connected to the magnetic amplifier to vary a brake control signal between zero and a preselected maximum voltage potential. When "P-wire" current exceeds the value 0.5 amps defining the upper limit of the preselected braking range, however, the brake transfer relay is effective to transfer the control capacitor to a constant voltage source to maintain the control capacitor charged to a voltage level corresponding to full brake release, with P-wire current variation between 0.5 amps and 1.0 amps being effective to establish propulsion control of the vehicle.

The voltage level to which the control capacitor is charged in braking range provides a brake demand signal which is modified by the vehicle load for controlling dynamic braking on the vehicle. A feedback signal representing the degree of dynamic brake effectiveness is compared with the load weighed brake demand signal for providing an error signal which is modified by a feedback signal of the effective pneumatic brake pressure controlling the magnitude of friction brake effort. The friction brake effort is thus regulated to supplement the dynamic brake and provide continuous blending therebetween. Additional auxiliary control circuits may be utilized to further modify the friction brake control signal to reflect inshot and/or snowbrake control, if desired.

The error signal is finally sensed by analog to digital driver circuitry which provides digital output signals at application and release wires 26 and 27 leading to the electric/pneumatic transducer valve 4.

Assuming the brake equipment is void of fluid pressure, charging must be accomplished to condition the equipment for operation. This is initiated by moving the controller handle 20 to initial charging position and activating the air compressor 9 to supply fluid pressure to main reservoir 10. The valve assembly of controller 1 is positioned in initial charging position such that supply valve 15 is seated, cutting off supply of fluid pressure from the main reservoir 10, pipe 22 and branch pipe 23 to the brake pipe 21 via branch pipe 24. Concurrently, exhaust valve 16 is unseated to vent brake pipe 21 to atmosphere via branch pipe 24, thereby maintaining brake pipe 21 void of fluid pressure.

Main reservoir pressure is connected via pipe 22 to a passage 28 in pneumatic brake control unit 3 leading to a one way check valve 29, to the emergency valve 8 and to the transducer valve 4. Fluid pressure at check valve 29 lifts the valve element thereof and flows to a passage 30 and a supply reservoir 31 which is charged to the pressure of the main reservoir 10.

Assuming emergency valve 8 is in its applied position, as it normally would be in accordance with brake pipe fluid pressure being vented, an annular cavity 32 surrounding the stem of a control piston 33 of emergency valve 8 establishes fluid pressure communication between a branch passage 34 of passage 30 and a passage 35 leading to a chamber 36 of service valve 5. Fluid pressure in chamber 36 acts on a piston abutment 37 in opposition to a return spring 38 to force the piston abutment out of release position, in which it is normally maintained by spring 38, into application position.

In application position, a valve seat 39 formed at the end of a stem 40 of the piston abutment engages a valve element 41 to interrupt communication of an exhaust passage 42 with a passage 43 leading to variable load valve 7. In consequence of valve element 41 being engaged by valve seat 39, the valve element is concurrently lifted off a supply valve seat 44, thereby establishing fluid pressure communication between passage 43 and a branch passage 45, which is connected with the supply reservoir 31 via passage 30.

At variable load valve 7, a differential piston 46 thereof subject to air spring pressure connected to a chamber 47 via passage 48 leading from the vehicle air springs or other load responsive device acts in concert with an adjustable spring 49 to force a valve element 50 off its seat 51. Consequently, fluid pressure in passage 43 is communicated past the unseated valve to a delivery passage 52 leading to the vehicle brake units to apply a "holding" brake force to the vehicle during the charging operation.

At service valve 5, a branch passage 53 leads from passage 43 to a balancing chamber 54 housing return spring 38 to force the piston abutment 37 to lap position when the opposing forces acting thereon are substantially balanced. In lap position, piston abutment 37 is retracted sufficiently to allow valve element 41 to engage supply seat 44 while still maintaining engagement with seat 39, to terminate further buildup of fluid brake pressure to the vehicle brake units. This "holding" brake pressure during initial charging, however, may be limited by variable load valve 7, as hereinafter explained for an emergency brake application.

Transfer valve 6 is a normally energized, three-way electro-magnetic type valve device having a valve element 55 operable between a pair of valve seats 56 and 57. A fault sensing device 57a, details of which are not shown and are not necessary for an understanding of the present invention, is provided to monitor the operating condition of electronic brake control unit 2. Under normal operating conditions, transfer valve 6 is conditioned to effect via valve seat 56 fluid pressure communication between a passage 58 and a passage 59 leading to a stability volume 60, to a feedback pressure/electric transducer 61, and to the electric/pneumatic transducer valve 4, which comprises a normally closed twosway electro-magnetic type application valve 62 and a similar release valve 63 to which application and release wires 26 and 27 are connected from electronic control unit 2.

In initial charging position of controller handle 20, the analog current generator portion 18 of controller device 1 generates a signal at P-wire 25 of approximately 0.5 amps, which is acted upon by electronic control unit 2 to in turn deenergize application wire 26 and energize release wire 27. Consequently, application valve 62 of the electric/pneumatic transducer valve is deenergized in which condition passage 59 is cut off from a passage 64 leading to atmosphere and release portion 63 is energized to effect fluid pressure communication between passages 28 and 59, the latter being consequently charged with main reservoir fluid pressure. Fluid pressure effective in passage 59 thence flows past valve seat 56 into passage 58 which is connected to a chamber 65 formed by a movable piston abutment 66 of service valve 5 which is separate from piston abutment 37 and is forced in a release direction, as shown, so as to not influence the "holding" brake force provided by piston abutment 37.

Service valve 5 is further provided with a control reservoir charging check valve 67 having fluid pressure from supply reservoir 31 connected at its underside via passage 30 and a branch passage 68. A passage 69 connects fluid pressure from check valve 67 to a passage 70 via which a control reservoir 71 is charged and to a chamber 72 formed on the side of piston abutment 66 opposite chamber 65. Due to a substantially balanced pressure condition maintained across piston abutment 66 during charging, piston abutment 66 is maintained out of engagement with a pusher stem 73 via which piston abutment 66 is engageable with piston abutment 37 only during service and emergency brake applications, as hereinafter explained.

A charging cut-off valve 74 of service valve 5 comprises a piston 75 having a stem about which is formed an annular cavity 76 for controlling fluid pressure communication between a branch passage 77 of passage 58 and passage 69. A spring 78 normally urges piston 75 toward a release position in which cavity 76 places passages 77 and 69 in communication to provide a parallel path for charging control reservoir 70 and chamber 71 until piston 75 is forced to applied position. Fluid pressure in passage 43 leading to variable load valve 8 and thence to the brake units is connected via a branch passage 79 to the face of piston 75 to force it into applied position when a preselected brake pressure is developed, thereby resulting in cavity 76 interrupting communication between passages 77 and 69.

With preliminary charging of the brake equipment now accomplished, as above explained, the equipment is prepared for operation under electro-pneumatic mode of control, except that the "holding" brake must be first released by moving the controller handle 20 to release position in which the electrical signal of P-wire 25 is maintained at 0.5 amps, the same as during initial charging, and fluid pressure in brake pipe 21 is increased to its maximum value in accordance with final charging of the brake equipment. In order to accomplish this final charging of brake pipe 21, exhaust valve 16 of pneumatic regulator 12 is seated and supply valve 15 is unseated, thereby communicating main reservoir 10 with the brake pipe 21 via pipe 22, branch pipe 23, supply valve 15 and branch pipe 24 until the pressure acting on the control piston 19 balances the compression force of spring 18 in lap position, as determined by the setting of adjustment screw 17. With the self-lapping valve assembly of pneumatic pressure regulator 12 in lap condition, valves 15 and 16 are concurrently seated to maintain the brake pipe pressure at the desired value.

A passage 80 in the pneumatic control unit 3 connects fluid pressure from brake pipe 21 to transfer valve 6, to a pressure switch 81 and to a chamber 82 formed on one side of the emergency valve control piston 33, which is consequently shifted to its release position as shown. In release position of the emergency valve 8, annular cavity 32 surrounding the stem of piston 33 interrupts communication between passages 34 and 35, and communicates passage 35 with a passage 83 leading to atmosphere. Fluid pressure effective in chamber 36 of service valve 5 is thus vented, permitting fluid pressure effective in balancing chamber 54 to cooperate with return spring 38 and force piston abutment 37 to release position in which the "holding" brake pressure at the vehicle brake units is exhausted to atmosphere via passage 52, variable load valve 7, passage 43, past unseated exhaust valve seat 39 and exhaust passage 42.

Concurrent with release of the "holding" brake pressure, as just explained, an annular cavity 84 surrounding the stem of the emergency valve control piston 83 connects main reservoir fluid pressure in a branch passage 85 of passage 28 to a passage 86 in the piston stem and thence around the tail of the piston stem to a passage 87 leading to a chamber 88 formed on the side of piston 33 opposite chamber 82 and also to a branch passage 89 via which a quick action chamber 90 is charged.

With final charging now accomplished, the brake equipment is conditioned for operation in either electro-pneumatic mode or automatic-pneumatic mode of control, the latter becoming automatically effective in the event a failure should occur within the electronic control unit 2 governing electro-pneumatic mode of control; the equipment is further conditioned to produce an automatic-pneumatic emergency brake application in response to venting of brake pipe 21 at an emergency rate during either electro-pneumatic or automatic-pneumatic mode of control.

Under normal operating conditions, fault sensing device 57a monitoring the electronic operating unit 2 maintains transfer valve 6 in an energized condition, in which passage 58 leading to the control chamber of service valve 5 is cut off from passage 80, in which fluid control pressure is varied in automatic-pneumatic mode and is communicated with passage 59, in which fluid control pressure is varied in electro-pneumatic mode.

When it is desired to effect a brake application on the train, the controller handle 20 is moved out of release position into the brake application zone in which pneumatic regulator portion 12 of the controller effects a reduction of fluid pressure in brake pipe 21 simultaneously with variation of the electrical signal in P-wire 25 by the analog generator portion 13 by an amount corresponding to the position of the controller handle in the zone of application.

The fluid pressure in brake pipe 21 and passage 80 is prevented by transfer valve 6, under normal electronic operating conditions, from controlling service valve 5; the P-wire signal, however, representing the brake demand is sensed by electronic control unit 2 which operates to energize application wire 26 and deenergize release wire 27 in the likely event the dynamic brake effectiveness is not sufficient to satisfy the brake demand. This calls for a friction brake application under electro-pneumatic mode of control.

Electro-magnetic release valve 63 is deenergized to cut off the supply of main reservoir fluid pressure in passage 28 from passage 59 which is simultaneously communicated to atmosphere via passage 64 of the electro-magnetic application valve 62 which is energized. Control pressure in chamber 65 of service valve 5 is thus vented to atmosphere via passage 58, transfer valve 6, passage 59, valve 62 and passage 64. A choke 91 is provided in passage 77 to restrict the rate of flow of control reservoir fluid pressure in chamber 72 of service valve 5 to atmosphere with control pressure via passage 70, passage 69, annular cavity 76 of charging valve piston 75, passage 77 and passage 58. Consequently, a pressure differential is created across piston abutment 66 which acts through pusher stem 73 to force piston abutment 37 to application position in which valve 41 is lifted from supply seat 44. Supply reservoir fluid pressure in passage 45 is thus able to flow past seat 44 to passage 43 and thence via the variable load valve 7 to passage 52 and the vehicle brake units; and via passage 79 to the face of charging valve piston 75 which is forced to applied position in which control reservoir pressure in passage 69 and chamber 72 of service valve 5 is cut off from passage 77 and thereby positively prevented from venting to atmosphere. This effectively traps fluid pressure in chamber 72 so as to provide a reference pressure against which variation of fluid pressure in chamber 65 is measured to effect the pressure differential acting on piston abutment 66.

Fluid control pressure effective in passage 59 acts on transducer 61 to produce an analog electrical feedback signal to the electronic control unit 2 corresponding to the degree of control pressure developed, thereby indicating the degree of pneumatic brake available. When this feedback signal of the available pneumatic brake is sufficient to satisfy the brake demand in concert with the effective dynamic brake, application wire 27 is deenergized by the electronic control unit 2 to consequently deenergize application valve 62 and terminate further venting of control fluid pressure from passage 59 and ultimately from control chamber 65 of service valve 5. With application valve 62 and release valve 63 of electric/pneumatic transducer 4 each deenergized, a lap condition of the pneumatic brake is called for.

The pneumatic brake pressure developing in delivery passage 43 is also effective in balancing chamber 54 of service valve 5 to oppose the control force acting on piston abutment 37. When the opposing pressure forces are substantially balanced, return spring 38 will force abutment 37 to lap position in which valve element 41 is engaged with both the supply and exhaust valve seats 44 and 39, respectively. This terminates further buildup of pneumatic brake pressure which is maintained by the self-lapping action of service valve 5 at a value corresponding to the degree of pressure reduction effected by the electric/pneumatic transducer 4 under control of electronic control unit 2.

When a brake release is desired, the controller handle 20 is moved toward release position, thereby producing an increase of fluid pressure in brake pipe 21 and a corresponding increase in the electrical signal of P-wire 25 by the action of pneumatic regulator portion 12 and the analog generator portion 13, respectively, of controller device 1. With transfer valve 6 still maintained in its normally energized condition, brake pipe fluid pressure in passage 80 remains cut off from the control chamber 65 of service valve 5 which is subject to control by variation of fluid pressure in passage 59 in accordance with operation of electric/pneumatic transducer 4.

The effective increase in the P-wire signal is sensed as a brake release call by electronic control unit 2 which operates to energize release wire 27 while maintaining application wire 26 deenergized. Consequently, release electro-magnetic valve 63 is energized to effect communication between main reservoir fluid pressure in passage 28 and passage 59 which remains cut off from atmospheric passage 64 by application valve 62. Fluid pressure developing in passage 59 is thus communicated via transfer valve 6 to passage 58 leading to control chamber 65 of service valve 5. The pressure increase in chamber 65 reduces the existing pressure differential across piston abutment 66, thereby upsetting the force balance on piston abutment 37 which is consequently driven to brake release position in which valve seat 39 on the end of stem 40 is pulled away from valve element 41. Fluid pressure effective in the vehicle brake units and in balancing chamber 54 of service valve 5 is connected to atmosphere past the unseated exhaust valve and passage 42.

When the increase in control pressure effective in passage 59 is indicated by feedback transducer 61 as having satisfied the P-wire signal, the electronic control unit will again produce a lap condition of the electric/pneumatic transducer 4 to terminate any further buildup of fluid control pressure in passage 59 and thus in control chamber 65 of the service valve 5. When a force balance is restored on piston abutment 37, the service valve will again assume a lap condition in which the valve element 41 is engaged by exhaust valve seat 39 to terminate further exhaust of brake pressure and valve element 41 is maintained in engagement with supply valve seat 44 to prevent supply of fluid pressure to the vehicle brakes.

It will be apparent that only when the controller handle is moved into full brake release will service valve 5 remain in release position to fully release brake pressure, thus providing proportional brake control of the vehicle brakes.

Displacement reservoir 60 is provided to add sufficient volume in passage 59 and control chamber 65 to prevent pressure fluctuations and displacement of piston abutment 66 from adversely affecting operation of service valve 5 during electro-pneumatic mode of control, as above explained.

Transfer valve 6 is adapted to switch control of service valve 5 from electro-pneumatic mode to automatic-pneumatic mode in the event a malfunction is detected in the electronic control unit 2 by the fault sensing device 57a. If it is assumed, for example, that transfer valve 6 is deenergized in response to a malfunction being detected by the fault sensing device, passage 58 leading to control chamber 65 of service valve 5 is cut-off from passage 59 and communicated with passage 80. Fluid pressure effective in brake pipe 21 is thus communicated via passage 80 and the transfer valve to passage 58 leading to the service valve control chamber 65. In that fluid pressure in brake pipe 21 is simultaneously varied proportionate with variation of the P-wire signal, a smooth transition of the brake control occurs. Since the electronic control unit 2 is arranged to continuously blend dynamic braking with pneumatic controlled friction braking in electro-pneumatic mode of control to satisfy the P-wire brake demand signal, it will be apparent that the dynamic brake must be cut out in response to a malfunction of the electronic control unit being detected by the fault sensing device to assure that the transition to automatic-pneumatic brake control does not produce excessive brake force on the faulted car which could result in passenger discomfort due to severe train interaction, wheel damage or even possible derailment.

It is also "important" to note that during both electro-pneumatic and automatic-pneumatic modes of operation, actuation of emergency valve 8 to applied position responsive to service rates of brake pipe reduction is prevented by providing "breathing" of quick action volume pressure in chamber 82 at the same rate as the brake pipe reduction in effect. In release position of the emergency valve control piston 33, quick action volume pressure effective in chamber 88 is unable to "breath" at the rate at which brake pipe pressure is being reduced, thereby resulting in a pressure differential being created across the control piston 33 to move it toward applied position. In passing through an intermediate position, however, an annular cavity 92 surrounding the stem of control piston 33 communicates passage 87 with an atmospheric port 93 via a restricted port 94 in passage 87 to provide venting or "breathing" of quick action volume pressure effective in chamber 88. This in effect destroys the pressure differential across control piston 33, thus preventing it from being driven into applied position, except by a higher rate of brake pipe reduction than the rate at which the quick action volume pressure is "breathing." Such higher rates of brake pipe reduction may be effected by operation of vent valve device 14 of controller 1 by manipulating the controller handle 20 to emergency position, by any additional vent valve device such as are conventionally located in a train brake pipe, or by a separated or broken brake pipe.

The function of the emergency valve 8 then, in addition to providing a "holding" brake during initial charging as heretofore explained, is to sense an emergency rate of brake pipe reduction through the train and to provide local venting of brake pipe fluid pressure at a vent valve device 95 of emergency valve 8; and to effect pressurization of passage 35 leading to chamber 36 of service valve 5 to produce an emergency brake application on each car.

Movement of the controller handle 20 to emergency position, for example, acts through the controller camshaft to deflect a stem 96 of a normally seated valve element 97 comprising vent valve device 14, thereby unseating the valve element 97 past which brake pipe fluid pressure effective in a branch passage 98 is exhausted to atmosphere at an emergency rate. This results in an immediate reduction of fluid pressure in chamber 82 of emergency valve 8 at a rate faster than the rate at which quick action volume pressure in opposing chamber 88 can vent to atmosphere via restricted port 94 in passage 87, thus creating a pressure differential across piston 33 which is thereby forced to its applied position. Annular cavity 32 consequently reestablishes fluid pressure communication between passages 34 and 35 to pressurize chamber 36 of service valve 5, as explained, for providing the "holding" brake during initial charging. Piston abutment 37 is in turn forced to application position irrespective of the mode of control in which the brake equipment is operating, the degree of brake application or release in effect at the time of the emergency, or the loss of control reservoir pressure, to produce an emergency brake application.

In that the supply reservoir pressure which pressurizes chamber 35 to produce the emergency brake application is maintained by main reservoir pressure via check valve 29 and passage 30, it will be apparent that the fluid pressure supplied to variable load valve 7 via delivery passage 43 is at a relatively high value corresponding to the pressure at which main reservoir 10 is charged. When the fluid pressure flowing past the normally open supply valve 50 of variable load valve 7 develops a force on differential piston 46 sufficient to balance the opposing adjustable force of spring 49 and air spring pressure in chamber 47, valve 50 will engage seat 51 and terminate further supply of fluid pressure to passage 52 and the vehicle brake units, thus assuring that the emergency brake forces developed are proportionate to the vehicle load condition to prevent undesirable wheel slide from occurring.

Concurrent with development of the emergency brake application, as above explained, annular cavity 92 is located in applied position of emergency valve piston 33 to communicate passage 87 with a passage 99 leading to the face of a vent valve piston 100, in bypass of restricted port 74 in passage 87. The vent valve piston 100 is consequently piloted by the buildup of quick action volume pressure. Brake pipe fluid pressure in passage 80 is vented to atmosphere via a branch passage 101 and a normally seated valve element 102 which is unseated in response to vent valve piston 100 being piloted, thus providing a local venting of brake pipe pressure to propagate by "quick action" the emergency brake application through the train.

Pressure switch 81 in passage 80 includes normally closed contacts which complete an interlock circuit (not shown) via which dynamic brake and vehicle propulsion are controlled. The pressure switch contacts are opened responsive to venting of brake pipe pressure to cut out the dynamic brake and vehicle traction motors during an emergency brake application.

Fluid pressure effective in quick action volume 90 and on the face of the vent valve piston is connected to atmosphere via a choke and passage 83 to provide a timed blowdown period during which the vent valve 102 is held open. Following blowdown of the quick action volume pressure, vent valve piston 100 is reset, allowing vent valve 102 to assume its normally seated position in which branch passage 101 of passage 80 interrupts communication of brake pipe pressure to atmosphere.

Movement of the controller handle 20 to release position will similarly allow vent valve device 14 thereof to assume its normal position interrupting venting of brake pipe pressure at vent valve element 94. In release position, main reservoir fluid pressure in branch passage 23 is communicated via supply valve 15 of controller device 1 to branch passage 24, as previously explained, to charge the brake pipe 21 and consequently reset emergency valve piston 33 to its release position in which chamber 36 of service valve 5 is vented to atmosphere via passage 35, annular cavity 32 surrounding the stem of emergency piston 33 and passage 83. Venting chamber 35 allows piston abutment 36 to return to release position in which brake pressure is exhausted, as previously explained.

It will therefore be apparent that the pneumatic brake equipment described operating in conjunction with the electronic control unit provides electro-pneumatic brake control as long as the fault detecting circuitry monitoring the electronic control unit indicates normal operation thereof, with automatic-pneumatic brake control available by automatic transition in the event the electronic unit malfunctions; and that an emergency brake application is available during either electro-pneumatic or automatic-pneumatic brake control.

Having now described the invention what I claim as new and desire to secure by Letters Patent, is:

1. Railway brake control apparatus comprising:
   a. a controller device for selecting the degree of braking desired, said controller including:
      i. regulator valve means for controlling variation of fluid pressure in a brake pipe in accordance with the degree of braking selected between full brake release and full brake application,
      ii. control means operative concurrently with said regulator valve means for providing an electrical signal which corresponds in value to fluid pressure effective in said brake pipe,
   b. fluid pressure responsive brake means,
   c. service valve means including a first control chamber and a piston assembly operative responsive to variation of fluid pressure in said first control chamber for control of fluid pressure at said brake means in accordance with the degree of braking selected,
   d. electronic brake control means conditioned by said electrical signal to produce a friction brake control signal,
   e. transducer valve means operable in response to said friction brake control signal for effecting variation of fluid pressure in a control passage,
   f. fault sensing means for monitoring said electronic brake control means to detect an abnormal operating condition thereof,
   g. selector valve means operative responsive to said fault sensing means for effecting transition of said first control chamber from fluid pressure communication with said control passage to fluid pressure communication with said brake pipe in response to an abnormal operating condition of said electronic brake control means being detected.

2. Brake control apparatus, as recited in claim 1, further comprising:
   a. said service valve means including a second control chamber subject to supply of fluid pressure for operating said piston assembly independent of operation of said piston assembly by pressurization of said first control chamber, and
   b. emergency valve means operable to an applied position for communicating a source of fluid pressure with said second chamber in response to venting of said brake pipe at a predetermined rate or in response to said source being charged with fluid pressure subsequent to depletion of fluid pressure from said brake pipe.

3. Brake control apparatus, as recited in claim 2, further comprising variable load valve means interposed between said service valve means and said brake means for limiting the maximum fluid pressure supplied to said brake means in accordance with the effective load carried by said vehicle.

4. Brake control apparatus, as recited in claim 2, wherein said controller device further comprises vent valve means operable only in emergency position of said controller for venting said brake pipe fluid pressure at said predetermined rate.

5. Brake control apparatus, as recited in claim 2, wherein said emergency valve means comprises a piston valve subject opposingly to fluid pressure effective in said brake pipe and to fluid pressure supplied to a quick action volume from said source when said emergency valve is in a release position, said piston valve being operable responsive to venting of said brake pipe fluid pressure to an intermediate position in which said quick action volume fluid pressure is vented at a rate sufficient to prevent further movement of said piston valve to said applied position except in response to venting of said brake pipe fluid pressure at said predetermined rate.

6. Brake control apparatus, as recited in claim 1, further comprising transducer means subject to fluid pressure in said control passage for providing a feedback signal to said electronic brake control means to continuously regulate said friction brake control signal in accordance with the actual braking effective under control of said electronic brake control means.

7. Brake control apparatus for each car of a multi-car railway train comprising:
   a. a controller device on one of said cars for selecting either an emergency or service brake application, said controller comprising:
      i. vent valve means operative only in emergency position of said controller for venting a continuous brake pipe extending through each car of said train at a predetermined rate,
      ii. regulator valve means for effecting variation of fluid pressure in said brake pipe at a rate less than said predetermined rate and by an amount corresponding to the degree of said service brake application desired between full brake application and full brake release, and iii. control means operative concurrent with said regulator valve means for providing in a continuous Pewire extending through each car an electrical signal which corresponds in value to fluid pressure effective in said brake pipe, and
b. fluid pressure responsive brake means,
c. service valve means including a differential piston assembly operative responsive to pressurization of either a first or a second control chamber formed thereby for controlling fluid pressure at said brake means in accordance with said service or said emergency brake application, respectively,
d. electronic brake control means conditioned in accordance with said electrical signal to produce a friction brake control signal,
e. transducer valve means operable in response to said friction brake control signal for effecting variation of fluid pressure in a control passage,
f. fault sensing means for monitoring said electronic brake control means to detect an abnormal operating condition thereof,
g. selector valve means operative responsive to said fault sensing means for effecting transition of said first control chamber from fluid pressure communication with said control passage to fluid pressure communication with said brake pipe in response to an abnormal operating condition of said electronic control means being detected, and
h. emergency valve means operative to an applied position responsive to venting of said brake pipe at said predetermined rate for communicating a source of fluid pressure with said second chamber and including second vent valve means operable to vent fluid pressure from said brake pipe in said applied position of said emergency valve means for propagating the venting of said brake pipe at said predetermined rate from one car to an adjacent car of said train.

* * * * *